(12) United States Patent
Zock et al.

(10) Patent No.: US 11,938,771 B2
(45) Date of Patent: Mar. 26, 2024

(54) SHOCK ABSORBER MOUNTING ASSEMBLY

(71) Applicants: Richard Mellick Zock, Lapeer, MI (US); Miles John Zock, Lapeer, MI (US)

(72) Inventors: Richard Mellick Zock, Lapeer, MI (US); Miles John Zock, Lapeer, MI (US)

( * ) Notice: Subject to any disclaimer, the term of this patent is extended or adjusted under 35 U.S.C. 154(b) by 375 days.

(21) Appl. No.: 17/305,465

(22) Filed: Jul. 8, 2021

(65) Prior Publication Data
US 2021/0331543 A1 Oct. 28, 2021

Related U.S. Application Data

(63) Continuation of application No. 17/301,656, filed on Apr. 9, 2021.

(60) Provisional application No. 62/972,837, filed on Feb. 11, 2020.

(51) Int. Cl.
*B60G 13/00* (2006.01)
*B60G 7/00* (2006.01)

(52) U.S. Cl.
CPC ........... *B60G 13/005* (2013.01); *B60G 7/001* (2013.01); *B60G 7/005* (2013.01); *B60G 2204/129* (2013.01); *B60G 2204/143* (2013.01); *B60G 2204/416* (2013.01); *B60G 2204/43* (2013.01); *B60G 2206/12* (2013.01); *B60G 2206/124* (2013.01)

(58) Field of Classification Search
CPC ...... B60G 13/005; B60G 7/001; B60G 7/005; B60G 2204/129; B60G 2204/143; B60G 2204/416; B60G 2204/43; B60G 2206/12; B60G 2206/124; B60G 2200/144; B60G 3/20
See application file for complete search history.

(56) References Cited

U.S. PATENT DOCUMENTS

| | | | |
|---|---|---|---|
| 9,988,083 B1 * | 6/2018 | Smith | ........................ B60G 3/20 |
| 11,130,378 B1 * | 9/2021 | Lambert | ................ B60G 7/008 |

(Continued)

FOREIGN PATENT DOCUMENTS

| | | | | |
|---|---|---|---|---|
| CN | 111032376 A | * | 4/2020 | ............. B60G 7/005 |
| CN | 111316013 A | * | 6/2020 | ........... B21C 23/002 |

(Continued)

*Primary Examiner* — Drew J Brown
(74) *Attorney, Agent, or Firm* — Dunlap Bennett & Ludwig, PLLC

(57) ABSTRACT

A shock absorber mounting assembly for an off-road vehicle is provided. The shock absorber mounting assembly provides a shock absorber adapter bracket that selectively interconnects a lower portion of the shock absorber and the original equipment manufacturer A-arm of the off-road vehicle. The present invention thus enables any model year shock absorber to be adapted to operatively associate with the steering system of any off-road vehicle of the same make and model, regardless of model year. The shock absorber adapter bracket may be of unitary construction of resilient material adapted to provide a main portion for selectively and rotatably connecting the original shock fork, wherein two fork portions of the shock absorber adapter bracket operatively associate with the lower portion of the shock absorber.

7 Claims, 6 Drawing Sheets

(56) References Cited

U.S. PATENT DOCUMENTS

| | | | | |
|---|---|---|---|---|
| 2010/0223974 | A1* | 9/2010 | Kucinski | B21D 51/06 |
| | | | | 72/324 |
| 2016/0059652 | A1* | 3/2016 | Weifenbach | B62D 17/00 |
| | | | | 280/124.144 |
| 2018/0281538 | A1* | 10/2018 | Gordon | B62D 21/11 |
| 2018/0290511 | A1* | 10/2018 | Gordon | F16C 11/0695 |
| 2021/0229224 | A1* | 7/2021 | Paulsen | B60G 7/001 |

FOREIGN PATENT DOCUMENTS

| | | | | | |
|---|---|---|---|---|---|
| CN | 114919358 | A | * | 8/2022 | |
| DE | 102012106152 | A1 | * | 1/2014 | B60G 13/005 |
| DE | 202018004756 | U1 | * | 12/2018 | B21C 23/002 |
| DE | 102019107713 | A1 | * | 10/2020 | B60G 13/005 |
| DE | 102020211709 | A1 | * | 3/2021 | B60G 13/006 |
| DE | 102021103439 | B3 | * | 5/2022 | |
| DE | 102021201756 | A1 | * | 8/2022 | |
| FR | 2752545 | A1 | * | 2/1998 | B60G 11/20 |
| WO | WO-2009106071 | A1 | * | 9/2009 | B23K 20/12 |

\* cited by examiner

SHOCK ABSORBER MOUNTING ASSEMBLY

CROSS-REFERENCE TO RELATED APPLICATION

This application claims the benefit of priority of U.S. Non-provisional application Ser. No. 17/301,656, filed 9 Apr. 2021, as a continuation thereof, the contents of which are herein incorporated by reference. This application claims the benefit of priority of U.S. provisional application No. 62/972,837, filed 11 Feb. 2020, the contents of which are herein incorporated by reference.

BACKGROUND OF THE INVENTION

The present invention relates to utility vehicle shock absorbers and, more particularly, a shock absorber adapter bracket assembly.

Manufacturers of off-road vehicles (or "machines")—such as but not limited to utility vehicles (UTV), all-terrain vehicles (ATV), go karts, motor bikes, dirt bikes, and the like—have designed their shock absorbers differently throughout the years of production, for even the same model of machine. In other words, one model year (or group of model years) may have a different shock absorber design relative to a previous model year (or group of model years); for instance, the 1989-2004 Yamaha warrior front shock absorber will not fit a 1987 or 1988 machine, same with other machines. Therefore, users of off-road vehicles are currently forced to use the corresponding model year shock absorber for that specific year's machine.

Unfortunately, there is no adapter available that would enable the user to fit a shock absorber from one machine's model year on to a machine of the same model but from a different model year. A "lowering" kit could look similar but would not work the same under the same conditions; rather lowering kits are made for lowering the stance of a machine instead of adapting all year shock absorbers for the same model of machine regardless of model year. Accordingly, these makeshift lowering-kit solutions tend to fail due to their unsuited design.

Furthermore, most suspension components, especially A-arms components, are weak and prone to bending, permanent deformation, and failure because (a) they are two or more pieces joined together and (b) suspension components are subject to repeated impact forces and stress, which can break the welds that join the pieces of the suspension component together, rendering the owner's vehicle inoperable. Purchasing and installing replacement components are expensive and take time.

As can be seen, there is a need for a shock absorber adapter bracket assembly enabling use of, in effect, an "all-year" shock absorber, whereby any model year shock absorber can be adapted to be operatively associated with the steering system of any off-road vehicle of the same make and model, regardless of model year. The present invention enables any model year shock absorber to be adapted to operatively associate with the steering system of any off-road vehicle of the same make and model, regardless of model year, through a shock absorber adapter bracket assembly that attaches to the original equipment manufacturer (OEM) A-arms of the off-road vehicle adding the non-model year shock absorbers. The material of the brackets is extremely high strength, in certain instances alloy steel.

The shock absorber adapter bracket assembly embodied in the present invention allows the all-year shock absorber to fit any year machine as long as the "model" is the same, providing a cost savings to the owners of such off-road vehicles. For instance, the 1987 or 1988 Yamaha warrior could sell for $150 or more, but if adapted to fit the 1989-2004 shock which could cost $80, the customer could purchase the 1989-2004 shock absorber to fit 1987 or 1988.

As can be seen, there is also a need for a system of A-arm suspension components of unitary construction for mounting of any shock absorber. The unitary construction of forged aluminum with or zero points of failure, embodiment in the present invention, can withstand higher tolerances than the prior art. The upper and lower A-arm suspension component/brackets may be square and entirely forged from aluminum or equivalent and can be dimensioned and adapted for all off-road vehicles. Again, the present invention also contemplates adaptable extended A-arms for all-year suspension components.

SUMMARY OF THE INVENTION

In one aspect of the present invention, a shock absorber mounting assembly, the assembly includes a Y-shaped bracket having two fork portions diverging from a main portion; an attachment body at a terminal end of the main portion; and each fork portion having a fork opening aligned with the other fork opening.

In another aspect of the present invention, the above assembly, wherein the assembly is a unitary construction, wherein the attachment body is a main knuckle extending in a first direction along a width of the main portion, wherein the width of the main portion is approximately twenty-eight millimeters, wherein the attachment body defines a through hole having a diameter of approximately ten and half millimeters, wherein the two fork portions are spaced apart approximately forty-one millimeters, and wherein each fork portion is a second knuckle defining the fork opening oriented in the first direction, and wherein each fork opening has a diameter of approximately ten and half millimeters.

In yet another aspect of the present invention, a method of selectively interconnecting a lower portion of a shock absorber to an original equipment manufacturer A-arm, the method including: connecting the through hole of the above-mentioned assembly to a shock fork of the original equipment manufacturer A-arm; connecting a lower end of the shock absorber between the two fork openings; and selectively setting an angle of incidence of the main portion relative to the original equipment manufacturer A-arm about an axis of rotation through the through hole.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a shock absorber mounting assembly for an off-road vehicle, wherein the shock absorber mounting assembly provides a shock absorber adapter bracket that selectively interconnects a lower portion of the shock absorber and the original equipment manufacturer A-arm of the off-road vehicle. The present invention thus enables any model year shock absorber to be adapted to operatively associate with the steering system of any off-road vehicle of the same make and model, regardless of model year. The shock absorber adapter bracket may be of unitary construction made of resilient material adapted to provide a main portion for selectively and rotatably connecting the original shock fork, whereby two fork portions of the shock absorber adapter bracket operatively associate with the lower portion of the shock absorber.

Figure 5:
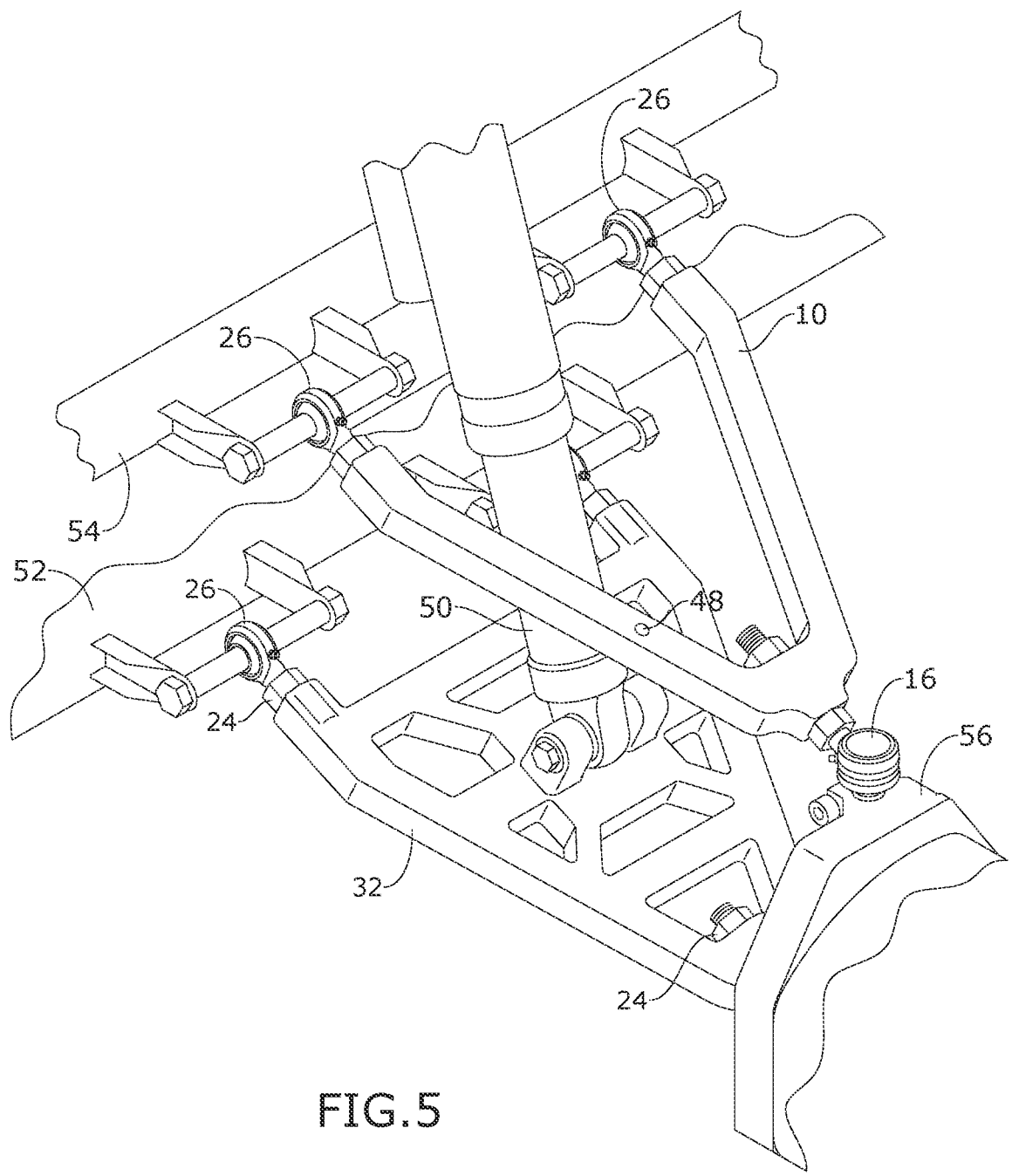
FIG. 5 is a perspective view of an exemplary embodiment of the present invention, shown in an installed condition.
Figure 6:
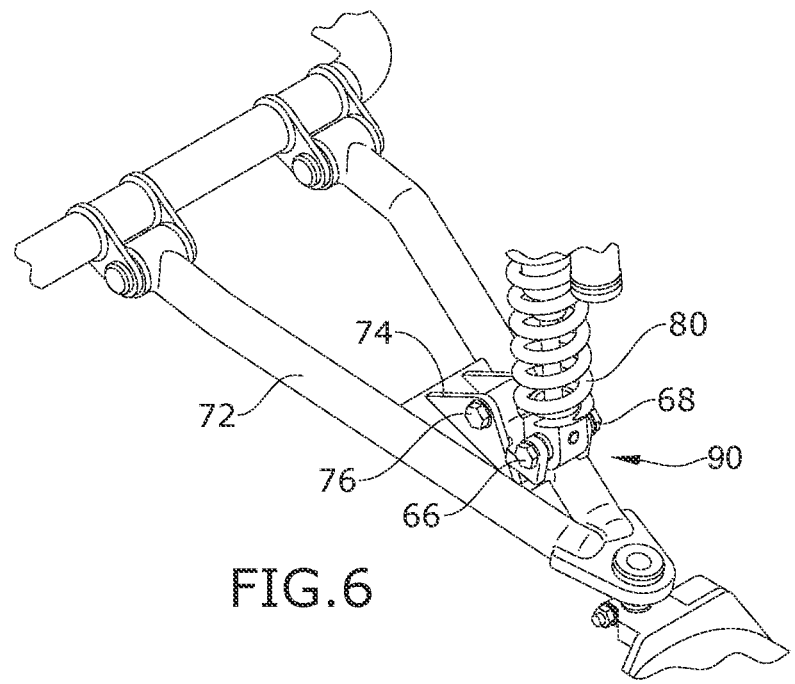
FIG. 6 is a perspective view of an exemplary embodiment of the present invention. shown in an alternative installed condition.
Figure 7:
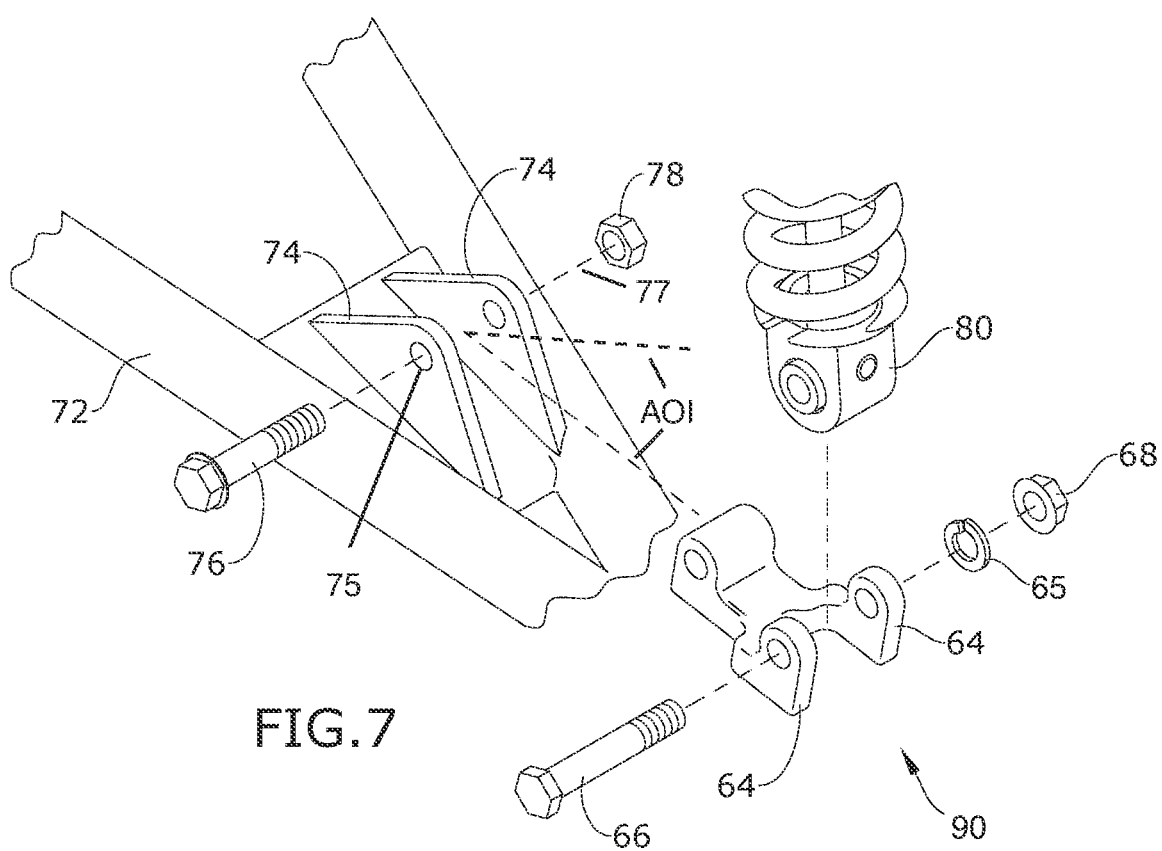
FIG. 7 is an enlarged partial exploded perspective view of FIG. 6.
Figure 8:
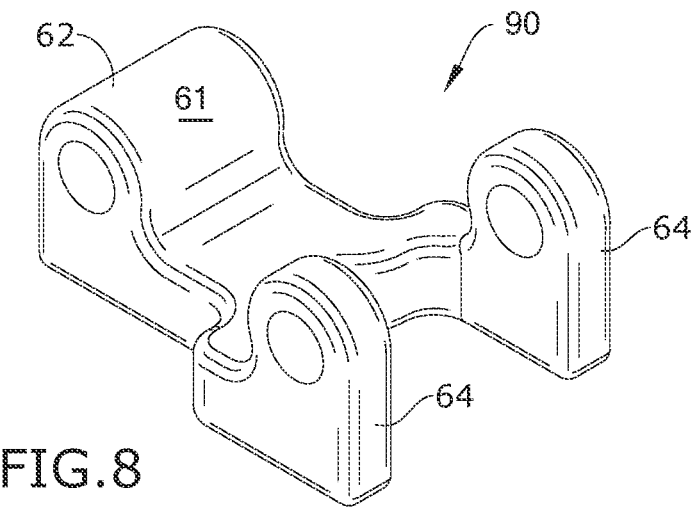
FIG. 8 is a perspective view of an exemplary embodiment of a shock absorber mounting assembly of the present invention.
Figure 9:
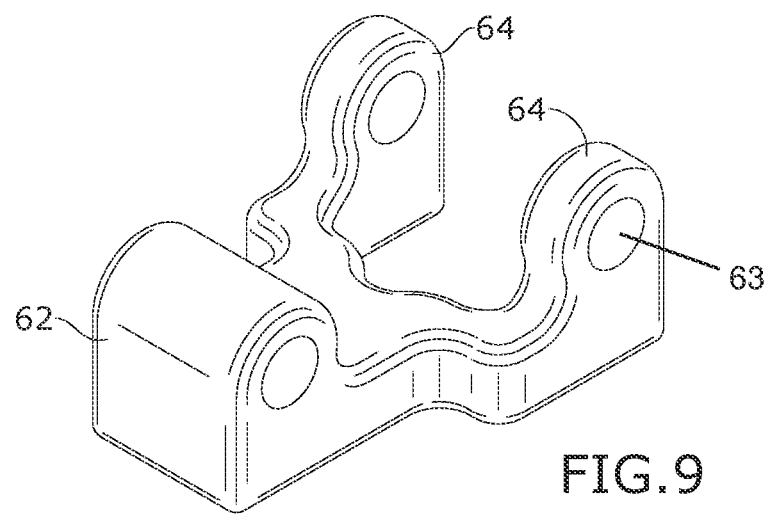
FIG. 9 is a perspective view of an exemplary embodiment of the shock absorber mounting assembly of the present invention.
Figure 10:
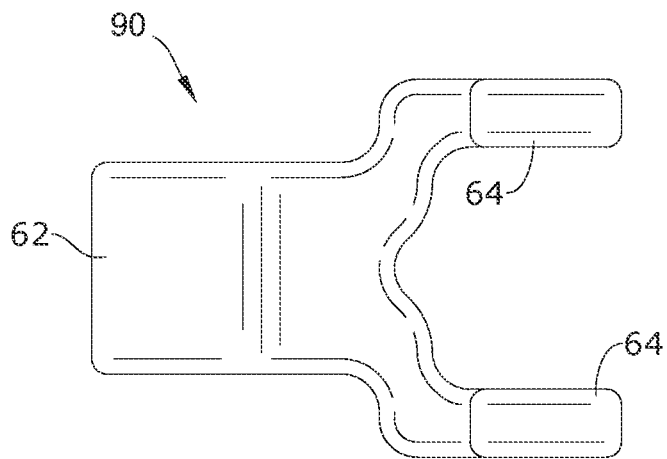
FIG. 10 is a top plan view of an exemplary embodiment of the shock absorber mounting assembly of the present invention.

It should be understood by those skilled in the art that the use of directional terms such as upward (e.g., "upper", "top", etc.) and downward (e.g., "lower", "bottom", etc.) and the like are used in relation to the illustrative embodiments as they are depicted in the figure: specifically, the upward direction being toward the top margin of FIG. 5 for all corresponding figures, and the downward direction being toward the bottom of FIG. 5 for all corresponding section figures.

Referring now to FIGS. 1 through 5, the present invention may include a shock absorber adapter bracket assembly 100. The shock absorber adapter bracket assembly 100 may include an upper bracket 10 and a lower bracket 32 interconnecting an upper frame 54 and lower frame 52 of a machine, respectively, to a wheel frame 56 at two different attachment points, as illustrated in FIG. 5.

Figure 1:
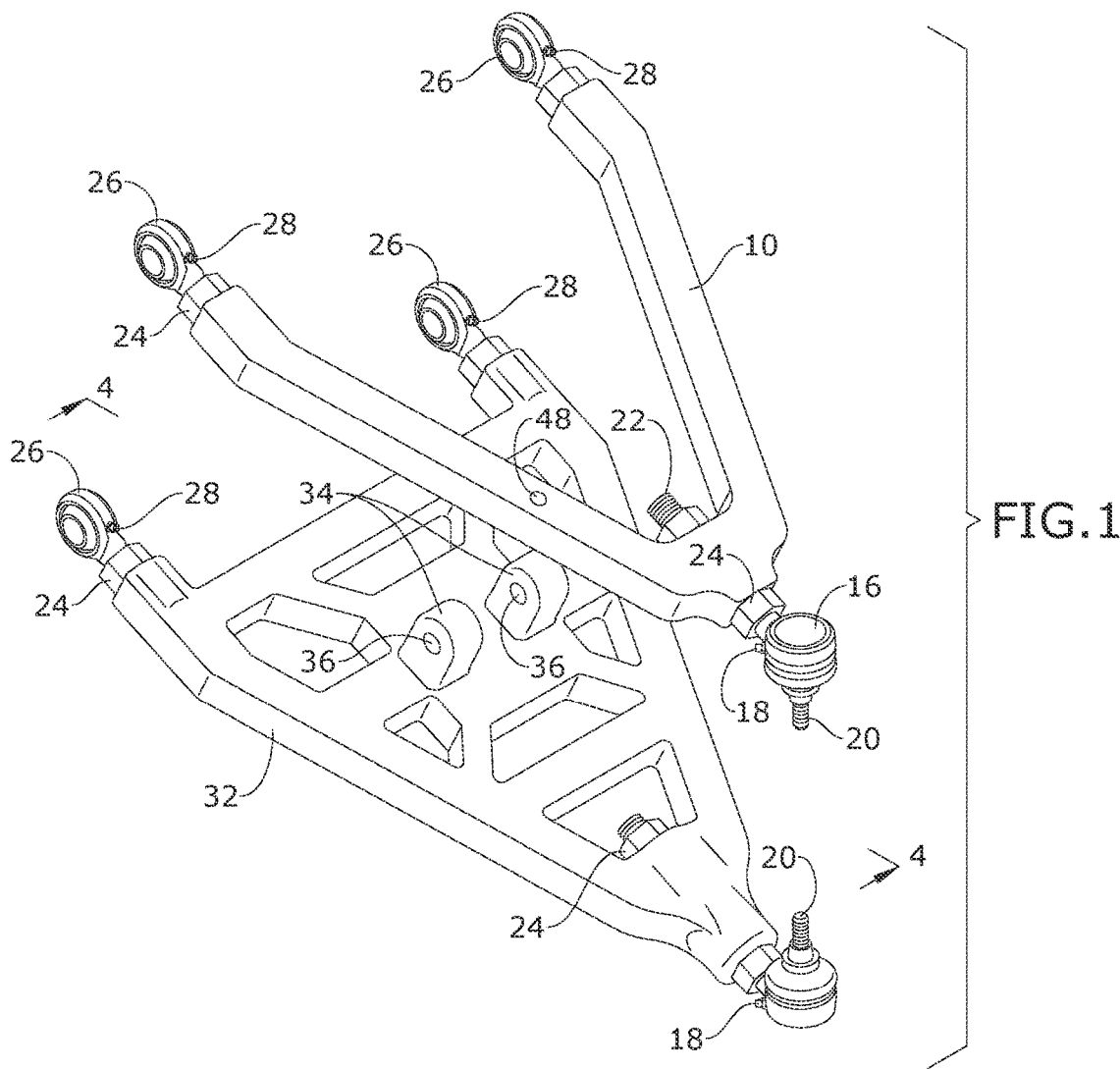
FIG. 1 is a perspective view of an exemplary embodiment of the present invention.
Figure 2:
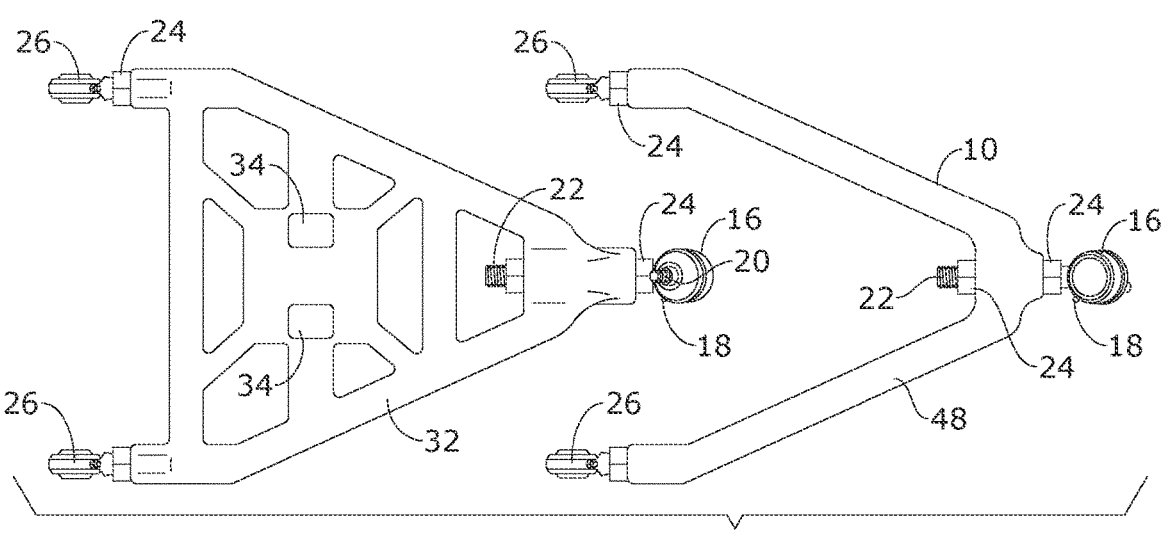
FIG. 2 is a top plan view of an exemplary embodiment of the present invention.
Figure 3:
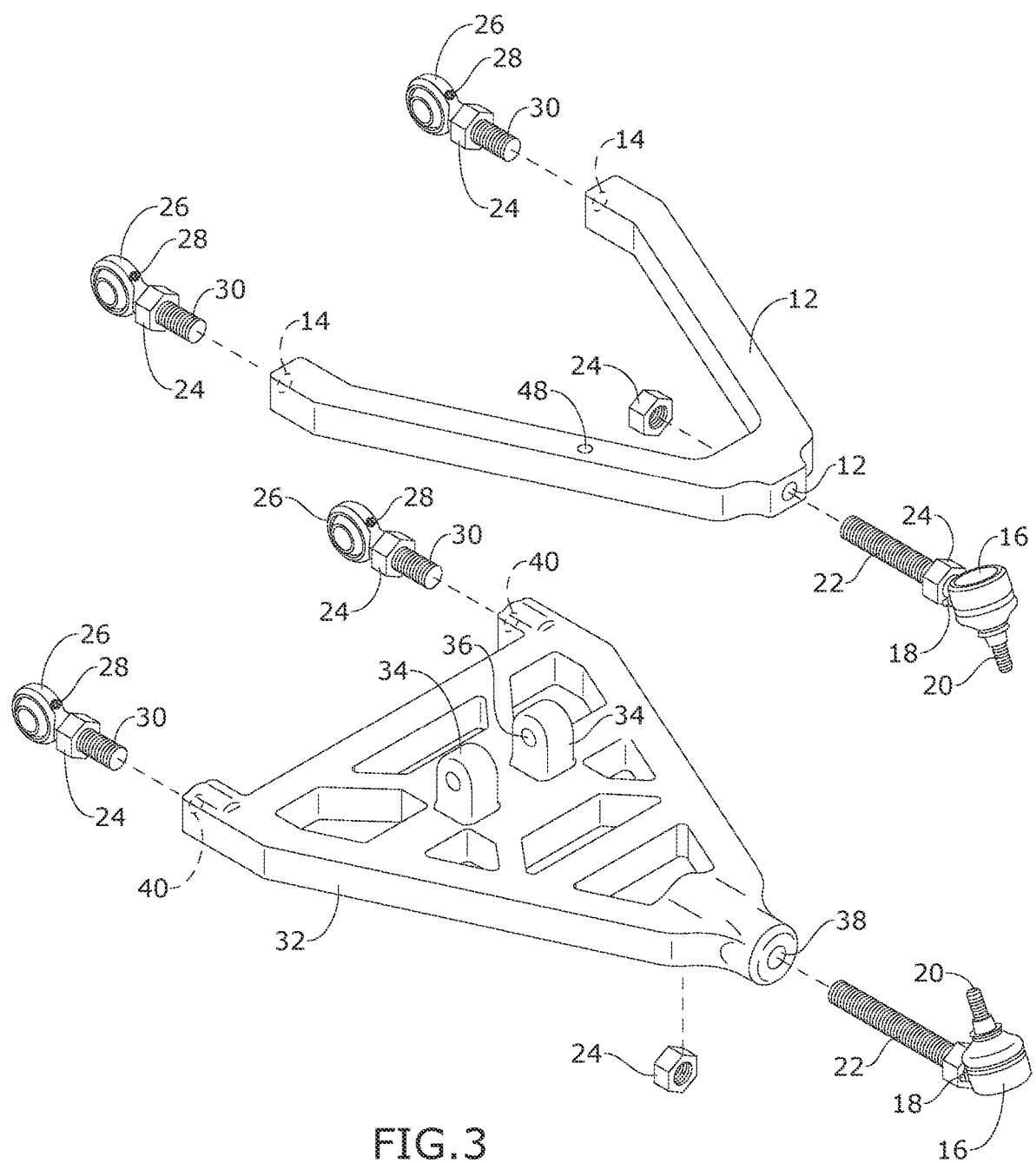
FIG. 3 is an exploded perspective view of an exemplary embodiment of the present invention.

Each bracket 10 and 32 provides two arms 11 and 33, respectively, that extend from a proximal end of the brackets 10 and 32 and converge at a distal end of the brackets 10 and 32, forming a V-shape, as illustrated in FIG. 3. Accordingly, both arms 11 or 33 together may be referred to as "A-arms". The lower bracket may have reinforcement between two arms 33 to, among other things, support a pair of shock forks 34. The upper bracket 10 may have a face hole 48 along an upper face of one of the arms 11. Each shock fork 34 may provide an interface 36 or hole dimensioned and adapted to operatively associate with the shock absorber 50, as illustrated in FIG. 5.

Each proximal end of the bracket's two arms 11 and 33 have arm holes 14 and 40, respectively. Each distal end of the bracket two arms 11 and 33 have a top hole 12 and 38, respectively.

Figure 4:
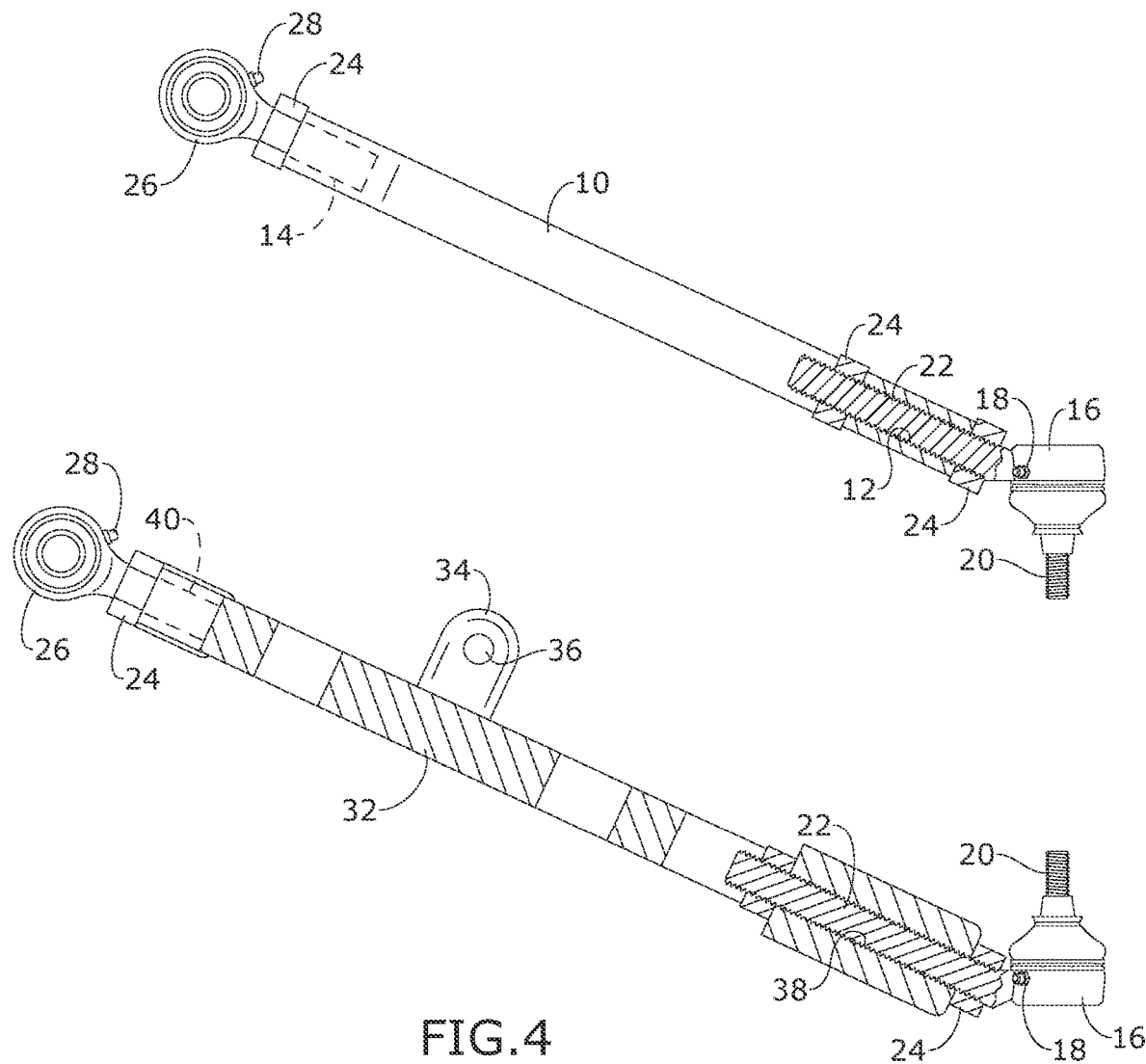
FIG. 4 is a section view of an exemplary embodiment of the present invention, take along line 4-4 in FIG. 1.

Each top hole 12 and 38 enable a ball joint assembly 60 to couple to the distal end. Specifically, each top hole 12 and 38 may be journaled entirely through their respective distal end. Each ball joint assembly 60 provides an angled ball joint 16 operatively associated with a ball joint post 22. The ball joint post 22 is dimensioned to thread into the respective distal end, by way of the top hole 12 or 38, so that a nut or other equivalent fastener 24 can secure the ball joint post 22 on each side of the distal end, as illustrated in FIGS. 3 and 4. In certain embodiments, this angle of incidence, A, may be adjustable, and may be from fifteen to thirty-five degrees. The angle of incidence, A, facilitates the adaptability of the "all-year" shock absorber 50 to any machine of the same make and model, regardless of model year.

Each angled ball joint 16 may provide a threaded connector post 20 dimensioned and adapted to connect to the wheel frame 56. The connector post 20 may be a bearing stud that may be tapered and threaded or otherwise adapted to fit a hole provided by the wheel frame 56, for instance in a steering knuckle of the wheel frame 56. The angled ball joint 16 enables adjustability in this connection through allowing a limited range of smooth movement in all directions. The angled ball joint 16 may have a ball joint grease fitting 18 (or "grease nipple") for greasing the ball joint when needed. The angled ball joint 16 may have an angle of incidence ('A' in FIG. 4) of the ball joint post 22 and a horizontal axis (parallel with the supporting surface of the vehicle/machine). Accordingly, in FIG. 4, it can be seen that an operative angle between the ball joint post 22 and the connector post 20 for the upper bracket 10 is between 105 and 125 degrees, while the operative angle between the ball joint post 22 and the connector post 20 for the lower bracket 10 is between 85 and 65 degrees. Whereby, the upper and lower operatively angles may be 'supplementary'.

Turning to the proximal end of the brackets 10 and 32, in particular, the arm holes 14 or 40 that are dimensioned and adapted to operatively associate with a respective straight ball joint assembly 70. Each straight ball joint assembly 70 may include a straight ball joint 26 operatively associated with a threaded straight ball joint post 30. Each straight ball joint 26 also may have a grease fitting 28 (or "grease nipple"). The straight ball joint 26 may be dimensioned and adapted to slidably receive an elongated fastener of the upper and lower frames 54 and 52, respectively, as illustrated in FIG. 5. The straight ball joint post 30 is dimensioned to thread entirely through the respective proximal end, by way of the top hole 14 or 40, so that a nut or other equivalent fastener 24 can secure the straight ball joint post 30 on each side of the respective proximal end, as illustrated in FIGS. 3 and 4.

A method of making and using the present invention may include the following. The shock absorber adapter bracket assembly 100 disclosed above may be provided through accommodating for the tolerance the relevant shock absorber 50 to be operatively associated with the machine, and that machine's suspension system, dimensions and the like.

A method of installing the shock absorber adapter bracket assembly 100 may include, but not be limited to, removing the lower part of the pre-existing shock absorber and brackets, followed by installing the lower bracket 32. The ball joints may be screwed in and adjusted to the upper A-arm bracket 10 that is then fitted to the frame 54 and 56 by the bolts, nuts, and washers. Likewise, the ball joints may be screwed in and adjusted to the lower A-arm bracket 32 that is then fitted to the frame 52 and 56 by the bolts, nuts, and washers, without tightening the fasteners. The ball joints are used for mounting the A-arms brackets to the frames 52 and 54 as well as fitting to the steering system of the wheel frame 56. The adjustable ball joints can be shuffled between the different left- or right-side A-arms including upper or lower side A-arms.

Then install the lower part of the "all-year" shock absorber 50 into place on the lower bracket 32 and fastening it to its pair of shock forks 34 by sliding a fastener through the fork holes 36 and mounted to the appropriate fitment. Once assembly is complete, the fasteners 20, 30, 22, and 24 may be tightened.

The present invention may embody an extended A-arm kit using the same components that are assembled and use as described herein.

Referring to FIGS. 6 through 10, a shock absorber adaptor bracket 90 can be attached directly to an OEM A-arm 72. The shock absorber adaptor bracket 90 can be installed in the OEM shock fork 74 providing interfaces 75 or holes dimensioned and adapted to operatively associate with the shock absorber 80, by way of fasteners 76 and 78. Fastener 76 may be a pivot pin.

The shock absorber adaptor bracket 90 may have a general Y-shape, wherein the main portion 62 of the Y-shape provides a journaled through attachment portion 61, and wherein the two fork portions 64 of the Y-shape each provide an opening 63 that are aligned. These two fork portions 64 may be dimensioned and adapted to act as replacement shock forks.

The fastener portion 61 may engage the pivot pin fasteners 76 so that an angle of incidence, AOI, may be selectively set between the shock absorber 80 and the shock absorber adaptor bracket 90. More specifically, the AOI is adjustable by rotating the journaled through attachment portion 61 about the axis of rotation 77 of the pivot pin 76 prior to using the other fastener(s) 78 to tighten and set the AOI. Thereby the AOI facilitates the adaptability of the "all-year" shock absorber 80 to any machine of the same make and model, regardless of model year.

The two fork portions 64 may operatively associate and secure the distal end of the shock absorber 80 by the way of fasteners 66, 65, and 68. Fastener 66 may be a pivot pin 66 defining an axis about which the distal end of the shock absorber 80 can pivot.

The material of the shock absorber adaptor bracket 90 may be a unitary construction of forged aluminum or other high strength material such as alloy steel. The unitary construction of the shock absorber adaptor bracket 90 affords zero points of failure through the absence of two or more pieces welded or otherwise joined together along their discontinuities, where weaknesses or fractures can develop as a result of the rugged forces reasonably anticipated through use of the all-terrain vehicle.

The method of installing the present invention may, in essence, involve first removing the distal end of the shock absorber 80 from the OEM shock fork 74, and then inserting the shock absorber adaptor bracket 90 in between the OEM shock fork 74 and the distal end of the shock absorber 80. Whereby the present invention enables any model year shock absorber to be adapted to operatively associate with the steering system of any off-road vehicle of the same make and model, regardless of model year. Through attaching the AOI of the shock absorber adapter assembly/shock absorber adaptor bracket 90 to the OEM A-arm 72 of the off-road vehicle, the user can add the non-model year shock absorber in a manner that adaptively facilitates the user selectively adjusting and setting the AOI between zero and ninety degrees.

As used in this application, the term "about" or "approximately" refers to a range of values within plus or minus 20% of the specified number.

It should be understood, of course, that the foregoing relates to exemplary embodiments of the invention and that modifications may be made without departing from the spirit and scope of the invention as set forth in the following claims.

What is claimed is:

1. A shock absorber mounting assembly, the assembly comprising:
    a Y-shaped bracket having two fork portions diverging from a main portion;
    an attachment body at a terminal end of the main portion; and
    each fork portion having a fork opening aligned with the other fork opening, wherein the assembly is a unitary construction, and wherein the attachment body is a main knuckle extending in a first direction along a width of the main portion.

2. The assembly of claim 1, wherein the width of the main portion is approximately twenty-eight millimeters.

3. The assembly of claim 2, wherein the attachment body defines a through hole having a diameter of approximately ten and half millimeters.

4. The assembly of claim 3, wherein the two fork portions are spaced apart approximately forty-one millimeters.

5. The assembly of claim 4, wherein each fork portion is a second knuckle defining the fork opening oriented in the first direction, and wherein each fork opening has a diameter of approximately ten and half millimeters.

6. A method of selectively interconnecting a lower portion of a shock absorber to an original equipment manufacturer A-arm, the method comprising:
    connecting the through hole of an assembly of claim 4 to a shock fork of the original equipment manufacturer A-arm; and
    connecting a lower end of the shock absorber between the two fork openings.

7. The method of claim 6, further comprising selectively setting an angle of incidence of the main portion relative to the original equipment manufacturer A-arm about an axis of rotation through the through hole.

* * * * *